No. 893,950. PATENTED JULY 21, 1908.
M. E. THOMAS.
MINING TOOL.
APPLICATION FILED MAR. 17, 1908.
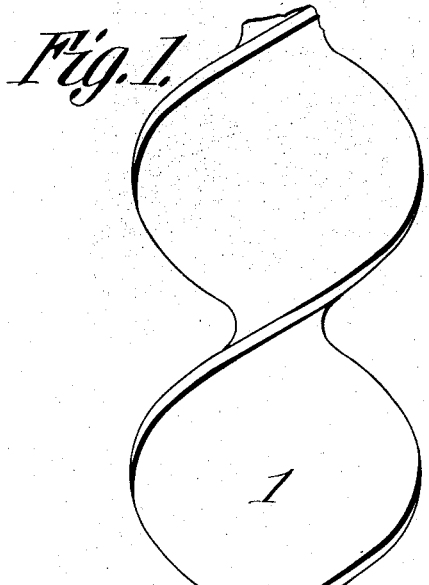
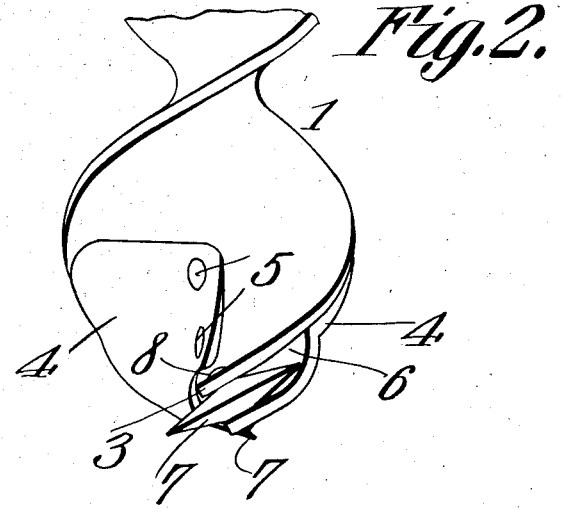
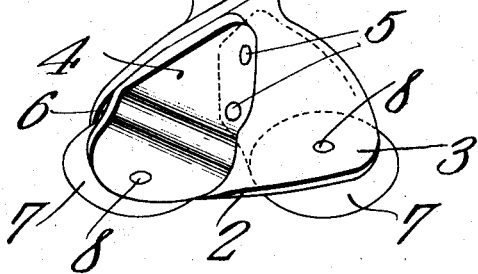
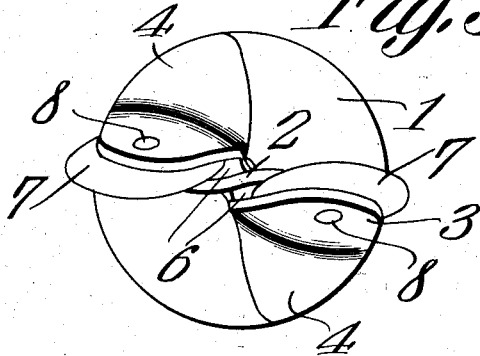
Witnesses
E. V. Stewart
S. P. Hollingsworth
Inventor
Maudie E. Thomas.
By C. A. Snow & Co
Attorneys

UNITED STATES PATENT OFFICE.

MAUDIE E. THOMAS, OF OTTUMWA, IOWA, ASSIGNOR OF ONE-HALF TO WILLIAM H. C. JAQUES, OF OTTUMWA, IOWA.

MINING-TOOL.

No. 893,950.  Specification of Letters Patent.  Patented July 21, 1908.

Application filed March 17, 1908. Serial No. 421,702.

*To all whom it may concern:*

Be it known that I, MAUDIE E. THOMAS, a citizen of the United States, residing at Ottumwa, in the county of Wapello and State of Iowa, have invented a new and useful Mining-Tool, of which the following is a specification.

This invention relates to a mining tool, more especially to one adapted for mining coal; and has for its object to provide a tool preferably w th a twisted shank resembling an auger, the cutting edges of which consist of rotatable disks pivotally mounted on the lower end of the twisted shank, each with its cutting edge in a plane inclined rearwardly and upwardly from a plane tangent to the lowest point of each cutting edge. The cutting edges of the disks project below the lower end of the shank and slightly beyond its periphery so that the hole cut thereby will be a little larger than the body of the tool.

Another object of the invention is to provide a simple means for mounting the cutting disks on the shank so that they can be quickly removed when dulled and sharp ones substituted.

With these and other objects in view the invention consists of the novel combination, construction and arrangement of parts hereinafter described and claimed; reference being had to the accompanying drawings forming a part of this specification, in which—

Figure 1 is an elevation of the cutting end of the improved mining tool; Fig. 2 an elevation of the tool at a right angle to Fig. 1; Fig. 3 a bottom view of the tool; and Fig. 4 a view of a modified form of support or bearing for a cutting disk.

Similar numerals of reference are used for the same parts in all the figures.

The twisted shank 1 of the tool has its lower end 2 slightly convexed, the corners 3, thereof, being curved as shown. A bearing plate 4 of iron or steel, shaped at its upper end to correspond to the curvature of the shank 1 and extending across the center thereof, is secured on each of its faces at opposite sides of the axis thereof by rivets 5, said rivets passing through both plates and the twisted shank 1. The lower end of each plate 4 is offset to produce a space 6 between itself and the shank 1 to receive a cutting disk 7 rotatably mounted on a pivot bolt or pin 8 the ends of which are carried respectively by the shank and the bearing plate. This construction produces an exceedingly simple and efficient boring tool, there being no wear on any part except the cutting disks which may be quickly renewed as soon as they become dull by removing their pivot bolts or pins and substituting new cutters which may be accomplished very quickly and without any appreciable loss of time and at slight expense.

It is to be noted that the pivots of the cutting disks are seated at one of their ends in the shank itself and at their other ends in a plate strongly riveted to the auger. The cutting disks have thus a firm, rigid and simple bearing, easily and cheaply made and quite compact. The cutting disks have their pivots disposed at such an angle that said disks incline upwardly from the cutting plane and rearwardly with respect to the direction of movement of the tool when in use. As thus disposed, the cutting disks when pressed against the material to be cut, are caused to rotate by frictional contact and rapidly disintegrate the material and bore a smooth cylindrical hole therein. The cutting disks are each preferably formed with a sharp cutting periphery thickened at the center for the hole through which the pivot pin passes, resembling two shallow cones united at their bases, their apices forming the hub.

A modified form of bearing for the cutting disk is illustrated in Fig. 4 and consists of a casting or forging 10 having an upwardly extending lug 11 shaped on one side to fit the spiral shank 1 and provided with one or more perforations for fastening rivets or bolts. Joining this lug 11 is a lip 12 between which two parts is a notch 13 for the lower end of the tool shank. The lower part of the bearing 10 is slotted upwardly from the bottom end to receive the cutting disk 7 pivoted on a pin 8 passing through the lower ends of the fingers 13 and 14 produced by the slot 15. This bearing while useful under some conditions is more expensive and less simple than the preferred form.

This invention although described exclusively as applied to a twisted shank is not to be limited in its use thereto, but it may be placed on any variety of boring tool to which it is applicable, and the invention is to be so understood.

Having described my invention, what I claim as new and desire to secure by Letters Patent is:—

1. A mining tool comprising a shank and rotatable cutting disks mounted therein with their axes inclined to the cutting plane.

2. A mining tool comprising a shank and rotatable cutting disks mounted on the end thereof with their cutting edges each in a plane inclined upwardly and rearwardly from a common plane tangent to the lowest point of each cutting edge.

3. A mining tool comprising a twisted shank, and cutting disks on the end thereof, one of said disks being rotatably mounted on each face of said shank in an inclined position their cutting edges projecting in advance of the shank.

4. A mining tool comprising a shank, cutting disks on the end thereof, a bearing plate riveted on each face of said shank a cutting disk between each of said bearing plates and the shank and projecting beyond the same, and pivots for said disks seated at their ends in the shank and the bearing plates and inclined to the cutting plane of said disks.

5. A mining tool comprising a twisted shank, cutting disks on the end thereof a bearing plate riveted to each face of said twisted shank and secured thereto by rivets or bolts common to both bearing plates, said bearing plates spaced at their lower ends from the shank to receive said cutting disks, and removable pivots for said disks seated in the shank and the bearing plates.

In testimony that I claim the foregoing as my own, I have hereto affixed my signature in the presence of two witnesses.

MAUDIE E. THOMAS.

Witnesses:
  Jo R. Jaques,
  Martin E. Thomas.